Patented May 9, 1933

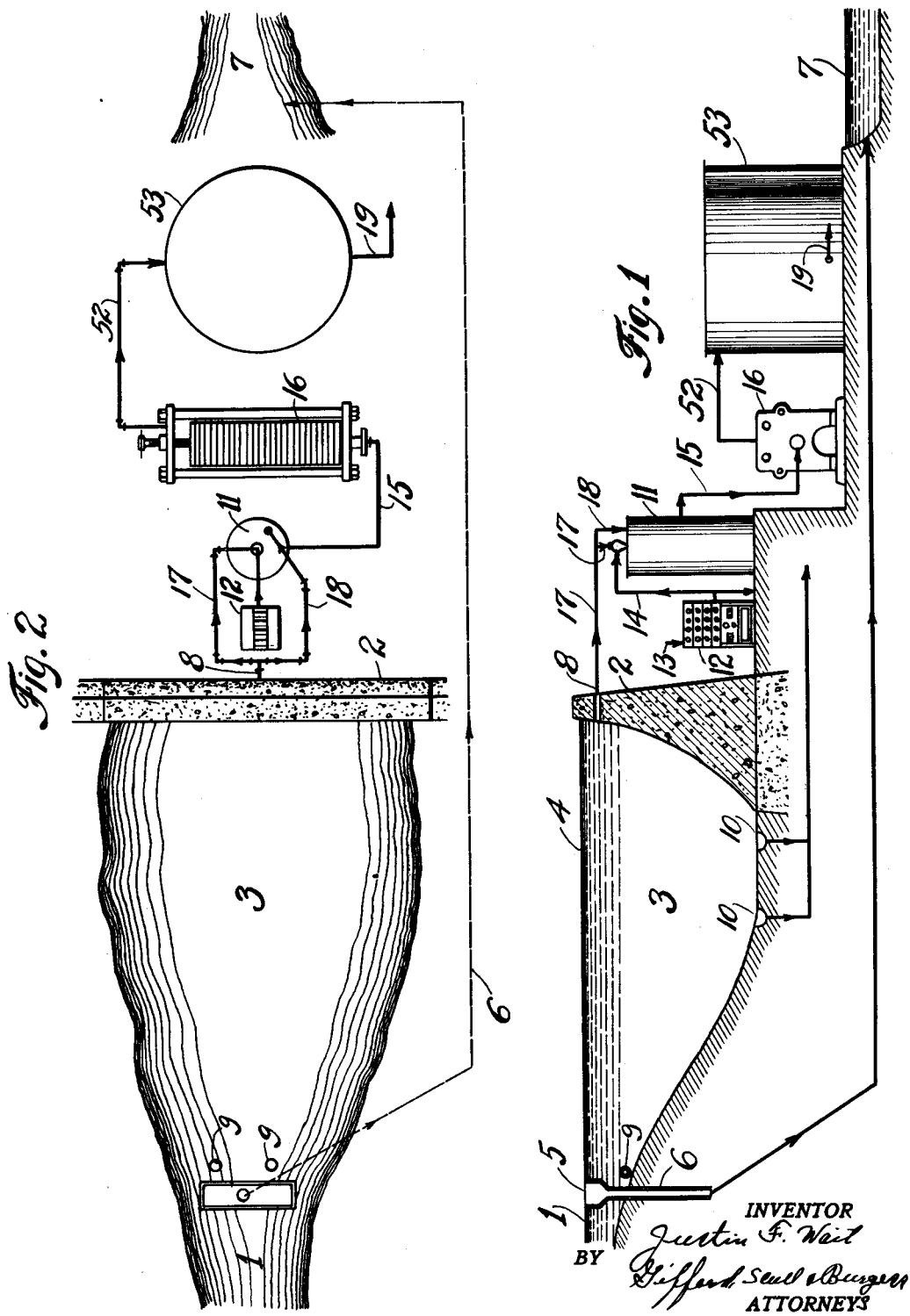

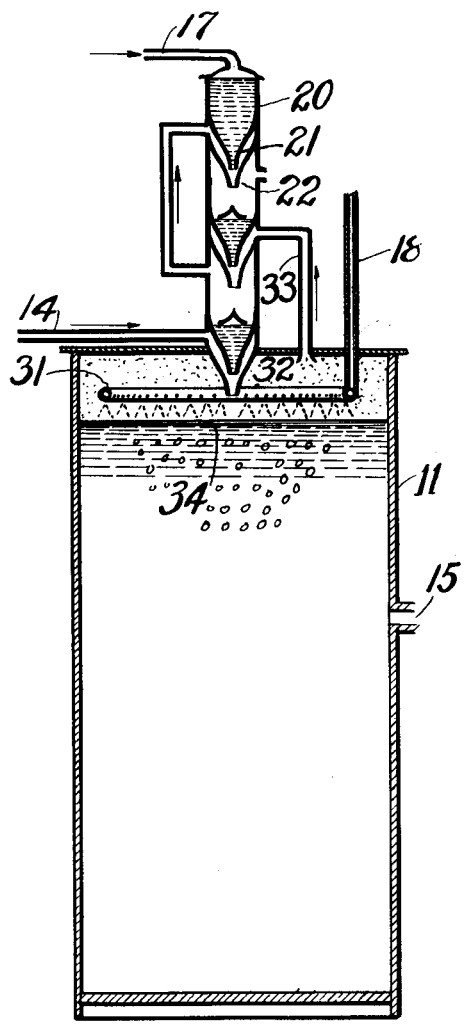
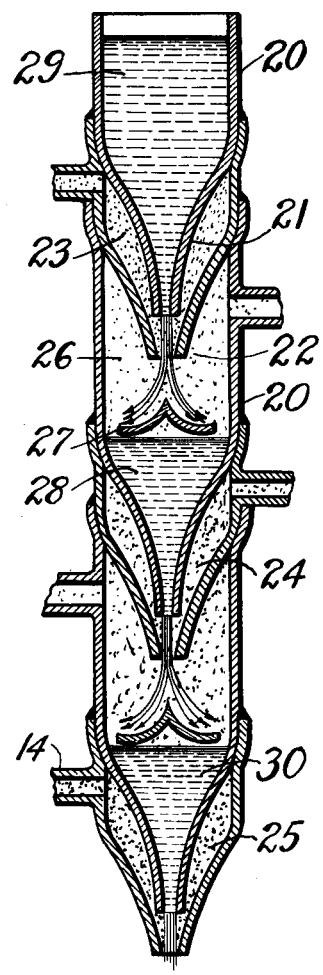

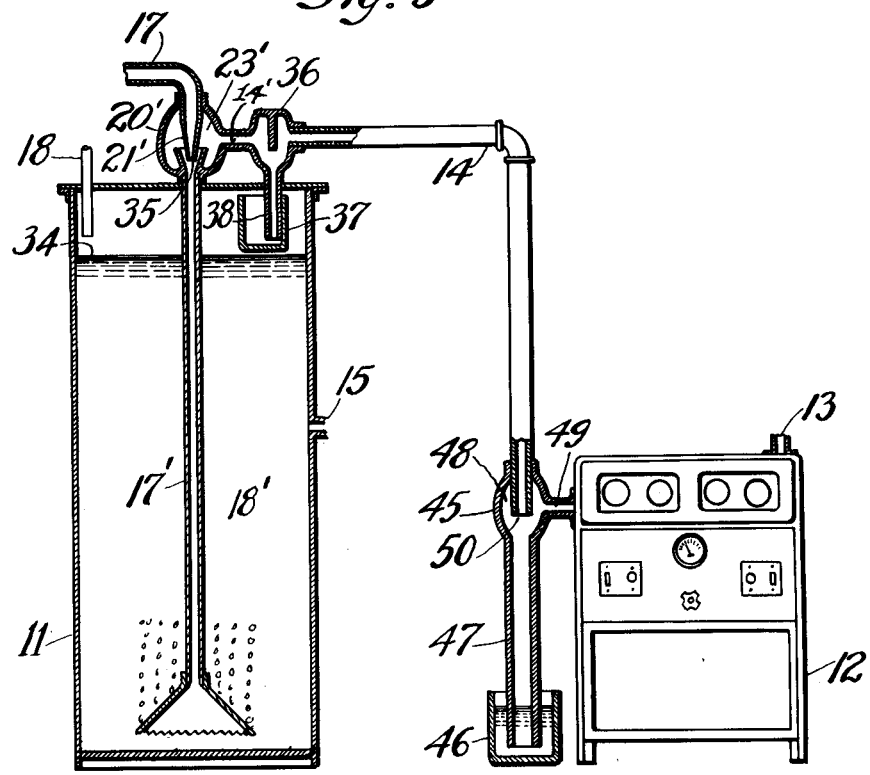
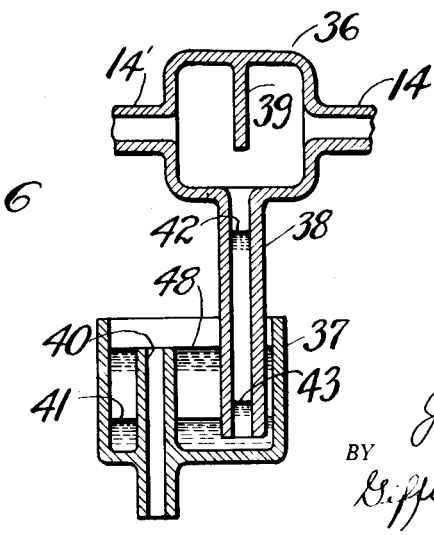

1,907,691

UNITED STATES PATENT OFFICE

JUSTIN F. WAIT, OF BRONX, NEW YORK

PROCESS FOR PURIFYING LIQUIDS

Application filed February 20, 1930. Serial No. 429,905.

This process relates to improvements in methods of purifying water or other liquid. By its use higher capacities are obtainable and the quality of water or other liquid may be improved to a marked degree. The invention will be particularly described in connection with the purification of water, but it is not restricted to this use.

One of the objectionable features, quite pronounced with commercial units in this art is the dimunition of rate of filtration. While a reasonable initial rate of filtration is easily attainable, the amount of deposition from turbid water is of sufficient quantity and of such quality as to form an almost impermeable secondary membrane. By preventing or decreasing such deposition better operation would therefore be obtained. To this end, I have found it desirable to remove an appreciable part of the colloidal and other suspensions occurring in the water to be treated and/or then to take special precaution to prevent the entrance of undue amounts of pollution into the water to be treated during times of flood.

By treating the impure water with ozone I have been able to improve its qualities. The amounts of ozone which I have used destroy most varieties of bacteria, particularly those of smaller dimensions. The spore forming type such as are not quickly destroyed by the ozone that is used may then be retained and held inactive by the filters.

The physical and electrophysical condition of the complex particles are such that they normally tend to plug the pores of filters and form a slimy, almost impermeable secondary membrane which acts in series with the original filtering medium and ultimately prevents passage of appreciable quantities of water. By my invention the properties of these particles are changed and a marked improvement is obtained.

The invention is especially applicable to a process using ultrafiltration for the production of a brilliant or "polished" water. It may however be modified or used in part for the production of a commercial water of a quality satisfactory for many purposes, as for example by elimination of the ultrafiltration step. Such a modification makes it possible to produce a water of excellent quality while employing ordinary filtration and allowing quite small quantities of colloidal matter to exist in the final product. In some instances ordinary filtration may be omitted.

The invention makes it possible to remove impurities in a preliminary step by a relatively cheap and in a sense far better method, thus decreasing the required amount of treatment. By using a combination of settling and ozonation steps to decrease or remove impurities my process actually destroys a large portion of the organic matter and bacteria in a very convenient manner and alters remaining portions so as to facilitate filtration or produce an acceptable quality.

Sterilization in the manner indicated herein is generally an aid to filtration which may follow as an additional treating step. By the expression sterilization as used herein I mean, the treatment of water to cause a material reduction in its bacterial content to such an extent that on analysis the water would be pronounced potable.

The common way of sterilization heretofore used has been by chlorination. The use of the chemical chlorine in any of its forms is considered as undesirable. In amounts sufficient to properly sterilize the water, it often imparts an odor and a taste to the water and in many instances increases its color. While ozone has been used in some instances for purifying water, its cost has prevented its common use and the water treated therewith has not usually been sufficiently brilliant or "polished", the ozone itself frequently producing suspensions, colloidal and otherwise, which even cause turbidity or increase the normal amount thereof.

The amount of impurities contained in the water to be treated generally determines the amount of ozone required for its treatment and hence influences the cost of purification. Filtration, especially if augmented by coagulation, will greatly reduce impurities and hence the amount of ozone required. Apparatus required to give good filtration is expensive and involves investment and operating costs, as well as care in operation. My invention enables me to reduce these costs and provide an economic unit for purifying water to an acceptable degree. It is particularly applicable to the usual conditions found when a small stream supplies water for municipal or other use.

For such application the invention may involve filtration and/or sterilization in combination with the well-known storage reservoir for settling and storage purposes with an unusual provision which allows the reservoir to operate uniformly and which prevents the pollution and erratical operation usually experienced. I have found that with a settling period in excess of 60 hours water sufficiently low in these impurities can be obtained so as to permit the economic use of ozone for pretreatment before ultrafiltration. By adding ozone in admixture with air in an amount sufficient to substantially reduce the color, the qualities of the partially purified water are very suitable for treatment which will result in high purity. This appears to be generally true of water whether it is derived from a swamp or from a rapidly moving stream. Such treatment gives water of satisfactory color, turbidity and odor, and water which is also of a satisfactorily low bacteria content and practically free from undesirable taste.

In carrying out the treatment by sedimentation and sterilization by ozone it is desirable to protect against undue pollution of a treated water supply by impure water obtained as in flood time. The application may include special means whereby it is then possible to purify water without the expense of coagulation and filtration.

The process commonly used for the collection and purification of water usually requires the erection of a dam across a stream bed to produce a storage space or reservoir. In most instances the quantity in storage is equivalent to a number of days of water consumption. In general, the water supply, usually a river or creek, varies immensely in the quantity of water delivered, so that the ratio of the supply to the storage volume varies greatly. In many instances the supply is less than the consumption during dry seasons and several or even hundreds of times greater than the consumption during a flood period.

As a control means to insure proper preliminary treatment, my invention provides that the velocity of flow be uniformly low and that the time element be made positive for settling and not below about 60 hours. An advantage of the reduction in velocity is that relative increase in the action of gravitation on suspended impurities results. Considerable turbulence of flow accompanies high velocity in such a supply stream. It is almost invariably sufficient to retain, in almost uniform suspension, impurities which could otherwise separate by sedimentation from the upper layers of water if they were still or nearly so. My invention provides means to give at substantially all times approximate uniformity of flow and insures a velocity considerably below the point of turbulence. This is to be contrasted with the ordinary collection and settling reservoir wherein flood water is allowed to flow through the reservoir displacing and wasting clear settled water. In many instances the velocity of flow is sufficient to cause some turbulence not only preventing purification by settling, but actually stirring up previously settled impurities which then further contaminate the supply.

My improved method involves a control to keep the water at a normal level. By normal level of a reservoir or equivalent water storage is meant a level between the normal limits of the reservoir when operating at near its rated capacity. It is obvious that this level will vary, becoming depressed during periods of heavy demand, and low supply and being elevated during periods of low consumption and high rate of flow of the water supply.

Ordinarily a water supply, upon being increased in quantity as in flood period is allowed to run through the storage reservoir, the spillway thereof then carrying away large amounts of excess water. By my invention I allow only a portion of the flood water to pass into the storage or collecting reservoir. This portion is preferably sufficient to keep the reservoir or basin at its normal level, regardless of the size of the supply stream, and makes it necessary for the remaining portions of the flood flow to be diverted and disposed of as by discharging it into the stream bed below the dam or walls which form the reservoir or basin. The water so diverted may be wasted or it may be utilized as for irrigation or power development.

The method of applying ozone is an important factor as it must be intimately contacted with the water to be treated. Methods involving high pressures may be used with reasonable success, but they involve unnecessary inconvenience and high costs. I have developed a method of mixing which is suitable for receiving an ozone-air mixture and mixing it with water to be treated and which can be operated with but little pressure loss. I have found it advantageous to form a thoroughly mixed mass and to keep such a mixture under appreciable pressure and to break successively the air masses containing the ozone into small portions, agglomerating the same and again breaking the same into small portions while contacting the small portions of air with water.

The strength of the ozone and the time of contact influence the physical properties of the impurities remaining after ozonation. I have found it desirable to first treat the water with air containing ozone of low concentration and to subsequently treat the then partially purified water with air containing ozone of higher concentration. This gives residual suspended portions which are more easily filtered. To accomplish this I have devised a system of countercurrent flow which brings the air of low ozone concentration into contact with water at greater pressure than that at which the high ozone concentration is applied.

This control of concentration and pressure has enabled me to accomplish the desired pretreatment with very low ozone consumption and with a very low time factor. In former tests from about three to ten minutes have usually been needed for the contact, but I have been able to accomplish very satisfactory results with my invention within about one minute and fair results within one-tenth of a minute.

Ozone is an unstable form of oxygen and under the conditions described is almost completely decomposed within about an hour. Within two minutes a large amount of the ozone has been dissipated or reverted back to oxygen, a stable substance. By quickly treating the water as above described, the desired reactions are brought about with less consumption of ozone. This is due in part to the short time element and hence less decomposition of ozone during the treating stage.

I have further found that it is possible to treat water with an excess of ozone and, by controlling the time element I can use the excess ozone to treat other water by mixing water containing excess ozone with the other water to be treated. To accomplish economical operation, such mixing is preferably carried out without about one minute of the addition of the last portion of ozone to the first portion of the water. To simplify operation, it is desirable to release portions of the air or other gas associated with the ozone in treating the first portion and to do so preferably before mixing with the second portion.

My invention will be understood from the description in connection with the accompanying drawings in which Fig. 1 is a vertical section showing the invention; Fig. 2 is a plan view of the same; Fig. 3 is a vertical section on an enlarged scale showing some of the details; Fig. 4 is a vertical section on an enlarged scale showing details of a modification; Fig. 5 is a vertical section showing another modification and Fig. 6 is a vertical section on an enlarged scale showing some of the details of Fig. 5.

In the drawings reference character 1 indicates a stream that is held by means of a dam 2 to form a reservoir or storage space 3 with a normal water level 4. A widened outlet or weir 5 with a discharge pipe 6 is used to carry away water in substantial excess of the consumption. This excess may be discharged as in the stream bed at 7.

The water in the reservoir 3 has but little movement so that within about sixty hours the upper layers will be of very low turbidity. An outlet at 8 may be used to withdraw the partially purified water. In extreme instances where the foreign matter is very colloidal or where there is a demand for unusually large quantities a coagulating agent such as alum may be added as at 9. A baffling device, not shown, may be used if desired to facilitate mixing the alum with the water. Settled matter may be withdrawn from lower layers through outlets 10.

The partially clarified water is passed through a contacting unit or tank 11 preferably of the type shown in Figs. 3 and 4, but which may be as illustrated in Figs. 5 and 6. Ozone is produced by means of an ozone generator indicated at 12 with an air inlet 13 and an ozone air mixture line 14 leading to tank 11. After contacting with ozone in the tank 11 the water passes through the line 15 into the filter 16. I have found that if a portion of the water discharging through the outlet 8 is bypassed and carried to the mixer 11 by a separate line 18 there is a considerable saving in cost of operation. Ozone in excess of that required to treat the water passing through the branch 17 of outlet 8 into the tank 11 is generated in the ozone generator 12 so that the water that passes through line 18 is thus indirectly contacted with ozone.

Water which has been treated is ready for delivery to the consumer. It may flow through the line 52 from the filter 16 to a storage tank 53 and thence through the outlet 19 to a supply main.

The mixer 20 shown in Figs. 3 and 4 contains a nozzle 21 which may be of circular or elongated cross section which discharges through a second nozzle 22. A reduced pressure is caused in the chamber 23 or space between nozzles 21 and 22 and likewise in the chambers 24 and 25 which operate similarly. Gas contained in the chamber 23 is mixed with water and portions which are not dissolved or reacted are released in the chamber 26 between the chambers 23 and 24. The water is preferably diverted by means of the baffle 27 and passes from this baffle into the chamber 28 above the nozzle, which is similar to the chambers 29 and 30 above the other nozzles.

The mixer can thereby be controlled to give countercurrent flow of water and ozone-air mixture entering through the pipe 14. Water which might be by-passed through the line 18 could be distributed by means of a perforated pipe 31 where it contacts with gases contained in the chamber 32 located below the mixer 20.

These gases are then passed upward through the line 33 and into chamber 25. Air released below the surface 34 in bubble form assists in mixing the contents of the tank 11.

In the mixer shown in Fig. 5 ozone may be introduced into liquids such as water by means of the water jet injector 20'. The hydrostatic head of the water entering through the branch pipe 17 passing through the nozzle 21' causes suction in the chamber 23' around the nozzle which in turn causes the air-ozone mixture from the ozone generator 12 entering through pipe 14 to be injected into the water at the region 35. The direction and turbulence of flow causes thorough mixing of the air and water. Such applications generally involve discharge of the mixture of air and water through a vertical pipe 17' leading to the bottom of a mass of water 18' contained in vessel 11. Bubbles of released air rise to the surface and are released. When the water pressure is materially reduced an air lift effect is produced and water is splashed upward in pipe 17' leading to the bottom of a mass of water 18' contained in vessel 11. Bubbles of released air rise to the surface and are released. When the water pressure is materially reduced an air lift effect is produced and water is splashed upward in pipe 17' and out through the air inlet pipe 14'.

The application may include a safety device to prevent water from entering the ozone generator and comprises chambers 36 and 37 which may be combined. These chambers are shown on an enlarged scale in Fig. 6 and operate to separate water and air and to prevent water from entering the piping 14 connecting with the ozone generator 12.

The pipes 14 and 14' are connected to opposite sides of the chamber 36. An outlet 38 leads from the bottom of the chamber 36 to the chamber 37. A baffle 39 in chamber 36 is of advantage to prevent the mixture of liquid and gaseous matter delivered by the pipe 14' from passing directly to the line 14. The chamber 36 thus acts as a separator, the liquid collecting in the bottom and passing downward by gravity through the outlet 38 and eventually escaping by flowing out through the outlet 40 in chamber 37 into the tank 11, thus maintaining a constant level in the chamber 37 above the lower end of outlet pipe 38.

By keeping a dense immiscible layer in the bottom of the chamber 37 at a level 40 above the lower end of the pipe 38 and giving a large area to the chamber 37 as compared with pipe 38 it is possible to withstand a fairly high vacuum at the upper end of this pipe 38 while allowing the liquid level in the pipe 38 to rise only to some level as indicated at 42. If mercury is used for the dense liquid it will rise to some such height as 43 so that the difference of the weight of the columns from level 41 to 42 and from level 41 to 43 is equal to the difference of the pressures at region at the upper end of the pipe 38 and that above the upper end of the pipe 40. When the injector is shut off and water and gaseous fluid splash into the chamber 36, the water flows downwards and out through the outlet 40.

A safety device for protecting the ozone generator is illustrated as chambers 45 and 46 with connection 47. Region 48 is a separator containing inlet 50 and gas outlet 49. Liquid discharges into seal 46.

I claim:

1. The process of purifying water in the flow of a stream which comprises materially reducing the velocity of flow of the water at a selected location in the stream flow, settling impurities from the water, and diverting portions of water from a point in the stream flow above the said location to a point below the said location in such quantities that the velocity through said location is substantially unaffected by the rate of flow of the stream.

2. The process of purifying water in the flow of a stream comprising materially reducing the velocity of flow of the water at a selected location in the stream flow, settling impurities from the water, and diverting unsettled portions of water from a point in the stream flow above the said location to a point below the said location in such quantities that the velocity through said location is substantially unaffected by the rate of flow of the stream, and sterilizing portions of the water which has been settled at the selected location.

3. The process which comprises mixing a liquid with a gas containing ozone, forming a mass of approximate uniformity, mixing the said mass with liquid to be treated, separating ozone-containing gas and causing countercurrent flow of liquid and the gas in such a manner that gas of lowest ozone content is under superatmospheric pressure while contacting the surface of the purified liquid.

4. The process which comprises treating portions of a liquid with air containing ozone, causing ozone to be abstracted from the air, causing the air with lowered ozone content to contact with liquid at pressures substantially above atmospheric and filtering the ozone-treated liquid within ten minutes of its treatment with the air of low ozone content.

JUSTIN F. WAIT.